(12) United States Patent
Nishida et al.

(10) Patent No.: US 7,694,528 B2
(45) Date of Patent: Apr. 13, 2010

(54) HEAT EXCHANGING APPARATUS

(75) Inventors: Shin Nishida, Anjo (JP); Masaaki Kawakubo, Obu (JP); Yoshitaka Tomatsu, Chiryu (JP)

(73) Assignee: Denso Corporation, Kariya (JP)

( * ) Notice: Subject to any disclaimer, the term of this patent is extended or adjusted under 35 U.S.C. 154(b) by 1956 days.

(21) Appl. No.: 10/457,726

(22) Filed: Jun. 9, 2003

(65) Prior Publication Data
US 2004/0031596 A1 Feb. 19, 2004

(30) Foreign Application Priority Data
Jun. 11, 2002 (JP) ............................... 2002-170020

(51) Int. Cl.
*F25B 1/06* (2006.01)
(52) U.S. Cl. ............................ 62/500; 62/509; 62/512; 165/172; 165/908; 417/151
(58) Field of Classification Search .................. 62/500, 62/509, 513, 113, 204, 210, 228.3, 512; 165/172, 165/173, 175, DIG. 471, DIG. 224, 900, 165/40, 50, 135, 908; 417/76, 87, 151, 168, 417/187, 198; 137/83, 282, 324
See application file for complete search history.

(56) References Cited

U.S. PATENT DOCUMENTS

| | | | | | |
|---|---|---|---|---|---|
| 3,131,553 | A | * | 5/1964 | Ross ............................ | 62/506 |
| 4,794,765 | A | * | 1/1989 | Carella et al. ................. | 62/512 |
| 5,078,959 | A | * | 1/1992 | Cinotti ........................ | 376/299 |
| 5,505,060 | A | | 4/1996 | Kozinski | |
| 5,546,761 | A | * | 8/1996 | Matsuo et al. ................ | 62/509 |
| 6,105,386 | A | * | 8/2000 | Kuroda et al. ................. | 62/513 |
| 6,189,334 | B1 | | 2/2001 | Dienhart et al. | |
| 6,233,969 | B1 | | 5/2001 | Yamauchi et al. | |
| 6,321,544 | B1 | * | 11/2001 | Kanai et al. ................... | 62/126 |

(Continued)

FOREIGN PATENT DOCUMENTS

DE 100 60 114 6/2001

(Continued)

OTHER PUBLICATIONS

French Search Report dated Aug. 16, 2004 from corresponding French Application No. 0306939.

(Continued)

*Primary Examiner*—Mohammad M Ali
(74) *Attorney, Agent, or Firm*—Harness, Dickey & Pierce, PLC (57) ABSTRACT

In a heat exchanging apparatus for a vapor compression refrigerant cycle, an internal heat exchanger is attached to an end of a radiator. The internal heat exchanger is arranged such that high-pressure refrigerant passages are closer to the radiator than low-pressure refrigerant passages. The heat exchanging apparatus can be mounted on a vehicle such that the radiator receives cooling air more than the internal heat exchanger. Because the internal heat exchanger performs heat exchange between high-pressure refrigerant and low-pressure refrigerant, performance of the internal heat exchanger is not degraded even if it is located at a part receiving less cooling air. Thus, the heat exchanging apparatus is easily mounted on a vehicle by integrating the internal heat exchanger with the radiator, without reducing a cooling capacity of the radiator.

22 Claims, 10 Drawing Sheets

U.S. PATENT DOCUMENTS

| | | | |
|---|---|---|---|
| 6,334,324 B1 * | 1/2002 | Muta et al. | 62/222 |
| 6,523,360 B2 * | 2/2003 | Watanabe et al. | 62/204 |
| 6,539,746 B1 | 4/2003 | Haussmann | |
| 6,585,494 B1 * | 7/2003 | Suzuki | 417/222.2 |
| 6,698,236 B2 * | 3/2004 | Yamasaki et al. | 62/509 |
| 7,036,567 B2 * | 5/2006 | Shimanuki et al. | 165/110 |
| 2002/0020183 A1 | 2/2002 | Hayashi | |

FOREIGN PATENT DOCUMENTS

| | | |
|---|---|---|
| EP | 0 487 002 | 5/1992 |
| EP | 0 779 481 | 6/1997 |
| JP | 57-77875 | 10/1955 |
| JP | 57-112671 | 12/1955 |
| JP | 03-291465 | 12/1991 |
| JP | 05-240511 | 9/1993 |
| JP | 6-137695 | 5/1994 |
| JP | 9166371 | 6/1997 |
| JP | 09-257337 | 10/1997 |
| JP | 10-129245 | 5/1998 |
| JP | 10-141804 | 5/1998 |
| JP | 2000-179997 | 6/2000 |
| JP | 2000-320930 | 11/2000 |
| JP | 2001-255042 | 9/2001 |
| JP | 2001-343173 | 12/2001 |
| JP | 2002-098424 | 4/2002 |
| JP | 2002-130849 A * | 5/2002 |
| JP | 2002-130874 | 5/2002 |

OTHER PUBLICATIONS

Examination Report dated Sep. 19, 2006 in corresponding Japanese Application No. 2002-170020.

Patent Abstracts of Japan: JP Publication No. 09-166363 dated Jun. 24, 1997.

* cited by examiner

HEAT EXCHANGING APPARATUS

CROSS REFERENCE TO RELATED APPLICATION

This application is based on Japanese Patent Application No. 2002-170020 filed on Jun. 11, 2002, the disclosure of which is incorporated herein by reference.

FIELD OF THE INVENTION

The present invention relates to a heat exchanging apparatus for a vehicular vapor compression refrigerant cycle.

BACKGROUND OF THE INVENTION

In general, a high-pressure side heat exchanger of a vehicular vapor compression refrigerant cycle is mounted at a front of a vehicle behind a bumper reinforcement. In a case that the bumper reinforcement extends from a right side to a left side of the vehicle in substantially the middle of the heat exchanger in a vertical direction, cooling air generally passes through a top portion and a lower portion of the heat exchanger. In some models, cooling air generally passes through left and right portions of the heat exchanger.

As for the vapor compression refrigerant cycle, for example, JP-A-2000-97504 (U.S. Pat. No. 6,189,334) proposes a method of improving a coefficient of performance by exchanging heat between a high-pressure refrigerant and a low-pressure refrigerant.

SUMMARY OF THE INVENTION

It is an object of the present invention to provide a new type of vehicular vapor compression refrigerant cycle having an internal heat exchanger that performs heat exchange between a high-pressure refrigerant and a low-pressure refrigerant.

It is another object of the present invention to provide a heat exchanging apparatus for a vapor compression refrigerant cycle with an improved mountability onto a vehicle.

According to an aspect of the present invention, a heat exchanging apparatus includes a first heat exchanger for radiating heat of a first refrigerant into air and a second heat exchanger for performing heat exchange between the first refrigerant and a second refrigerant having a pressure lower than that of the first refrigerant. The first heat exchanger includes a plurality of tubes arranged in parallel and a header tank connected at ends of the tubes such that a longitudinal axis of the header tank is perpendicular to longitudinal axes of the tubes. The second heat exchanger is integrated with an end of the first heat exchanger such that the longitudinal axis of the second heat exchanger is parallel to the longitudinal axis of the header tank.

Since the first heat exchanger and the second heat exchanger are integrated, the heat exchanging apparatus is easily mounted on a vehicle. Because the second heat exchanger performs heat exchange between the first refrigerant and the second refrigerant, the heat exchanging apparatus can be arranged such that the first heat exchanger receives cooling air more than the second heat exchanger receives. Therefore, the first heat exchanger and the second heat exchanger can be integrated and mounted without reducing cooling capacity of the first heat exchanger.

The heat exchanging apparatus can be used for a vapor compression refrigerant cycle including an ejector and a gas-liquid separator. The ejector and the gas-liquid separator can be integrated with the first heat exchanger and the second heat exchanger at the end of the first heat exchanger. Therefore, the gas-liquid separator and the ejector are easily mounted on the vehicle with the ejector and the gas-liquid separator, without reducing cooling capacity of the first heat exchanger.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

First Embodiment

Figure 1:
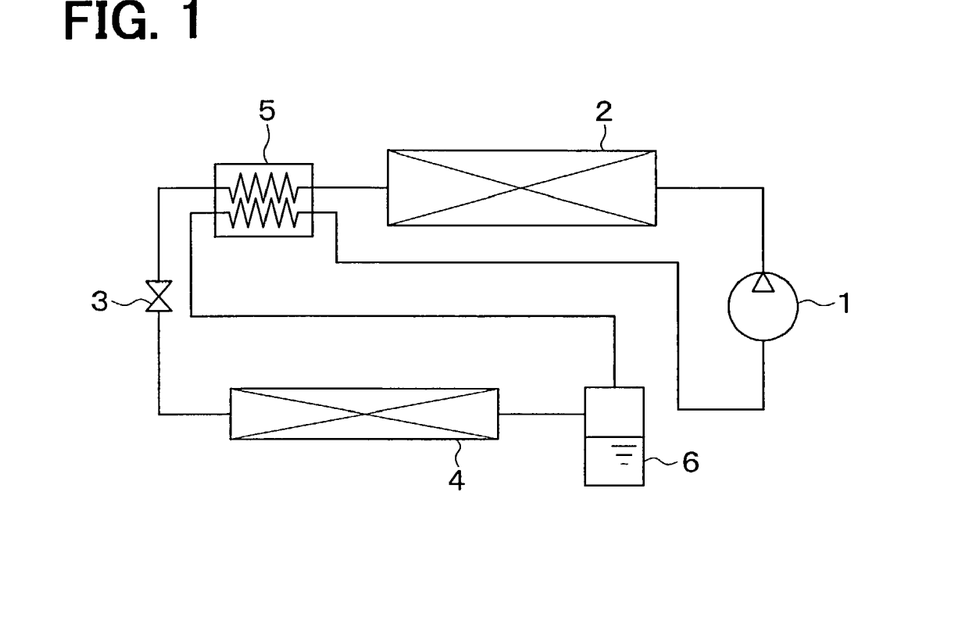
FIG. 1 is a schematic diagram of a vapor compression refrigerant cycle according to the first embodiment of the present invention.

A vapor compression refrigerant cycle shown in FIG. 1 is for example used for a vehicular air conditioning unit. A compressor 1 sucks and compresses a refrigerant by receiving a driving force from an engine or a motor. A radiator 2 is a high-pressure side heat exchanger. The radiator 2 performs heat exchange between the high-pressure refrigerant that has been compressed in the compressor 1 and air outside of a passenger compartment, thereby radiating the heat of the high-pressure refrigerant into the air.

An expansion valve 3 is a pressure-reducing device for decompressing and expanding the high-pressure refrigerant in an isenthalpic form. The expansion valve 3 controls a pressure of the high pressure refrigerant before decompressed by the expansion valve 3 based on a temperature of the high-pressure refrigerant that is before decompressed by the expansion valve 3 so that the vapor compression refrigerant cycle maintains a coefficient of performance on substantially a maximum level.

An evaporator 4 is a low-pressure side heat exchanger. The evaporator 4 evaporates the low-pressure refrigerant that has been decompressed by the expansion valve 3 and in a gas and liquid state and cools air to be blown into the passenger compartment. An internal heat exchanger 5 performs heat exchange between the high-pressure refrigerant and the low-pressure refrigerant.

An accumulator 6 is a gas-liquid separator. The accumulator 6 separates the refrigerant discharging from the evaporator 4 into a gas refrigerant and a liquid refrigerant. The accumulator 6 stores a surplus refrigerant therein and supplies the gas refrigerant to an inlet of the compressor 1.

Figure 2A:
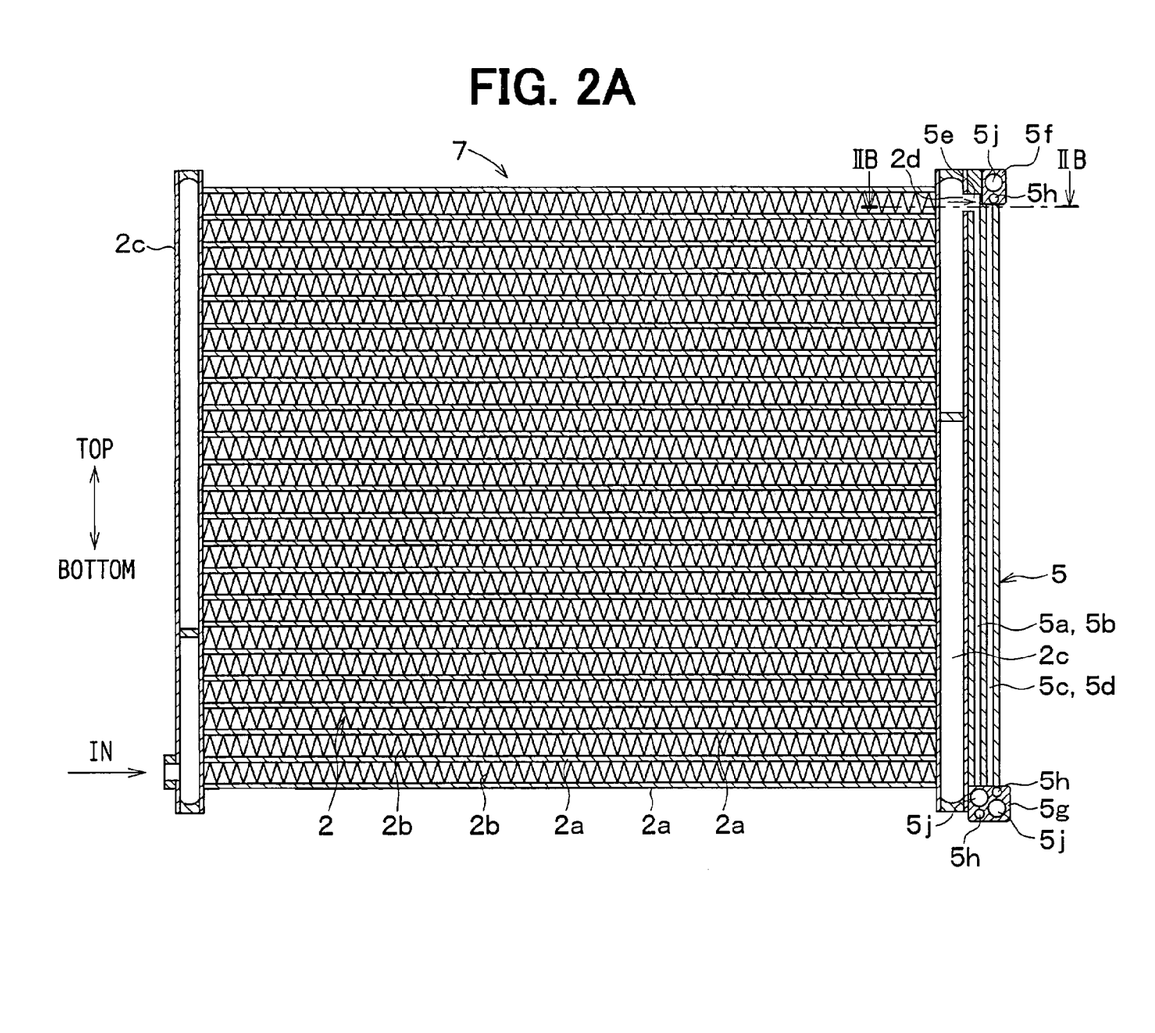
FIG. 2A is a cross-sectional view of a heat exchanger according to the first embodiment of the present invention.
Figure 2B:
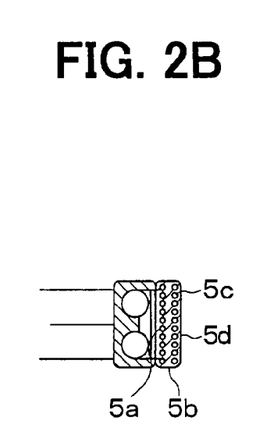
FIG. 2B is a cross-sectional view of a main part of the heat exchanger taken along line IIB-IIB in FIG. 2A.

As shown in FIGS. 2A and 2B, the radiator 2 and the internal heat exchanger 5 are integrated. Hereinafter, the integrated radiator 2 and internal heat exchanger 5 will be referred to as a heat exchanger (heat exchanging apparatus) 7.

The radiator 2 is constructed of a plurality of tubes 2a through which the refrigerant flows, fins 2b joined on outer surfaces of the tubes 2a and header tanks 2c provided at longitudinal ends of the tubes 2a to communicate with the tubes 2a. The fins 2b are corrugated to enlarge heat transmission surface areas with cooling air.

Here, the heat exchanger 7 is mounted on the vehicle such that the tubes 2a are arranged substantially horizontally and the header tanks 2c are arranged substantially vertically. Further, insides of the header tanks 2c are divided into a plurality of spaces.

In the radiator 2, the high pressure refrigerant flows horizontally repeated U-shapes from the bottom tube 2a to the top tube 2a. Then, the refrigerant flows into the header tank 2c (right header tank 2c in FIG. 2) and further into the internal heat exchanger 5 integrated to the horizontal end of the radiator 2.

The internal heat exchanger 5 includes a high-pressure tube (first tube) 5b forming a plurality of high pressure refrigerant passages 5a therein and a low pressure tube (second tube) 5d forming a plurality of low pressure refrigerant passages 5c therein. The high pressure tube 5b and the low pressure tube 5d are provided by a porous tube that is integrally molded by extrusion or drawing. In the embodiment, the porous tube is formed by drawing.

The internal heat exchanger 5 is brazed with the radiator 2. Specifically, the porous tube is brazed with the header tank 2c such that the high pressure refrigerant passages 5a are adjacent to the radiator 2 and longitudinal directions of the passages 5a are parallel to the longitudinal direction of the header tank 2c, as shown in FIGS. 2A and 2B. In place of brazing, the internal heat exchanger 5 can be soldered to the header tank 2c in a similar manner.

Further, the radiator 2 and the internal heat exchanger 5 are joined together such that a refrigerant outlet 2d of the radiator 2 is adjacent to a refrigerant inlet 5e of the internal heat exchanger 5. Thus, a refrigerant pipe for connecting the refrigerant outlet 2d and the refrigerant inlet 5e is not required.

The internal heat exchanger 5 is disposed such that the high pressure refrigerant and the low pressure refrigerant flow parallel, but in opposite directions. For example, the high pressure refrigerant flows from the top to the bottom and the low pressure refrigerant flows from the bottom to the top in FIG. 2A.

Connecting blocks 5f, 5g into which pipes are connected are provided at the ends of the internal heat exchanger 5. The connecting block 5f communicates with an inlet of the compressor 1 through the pipe. The connecting block 5g communicates with a gas refrigerant outlet of the accumulator 6 and an inlet of the expansion valve 3 through the pipes, respectively.

The connecting blocks 5f, 5g are formed with screw holes 5h and openings 5j through which the refrigerant flows. The screw holes 5h are female screw holes into which bolts fastening the connecting blocks 5f, 5g and connecting blocks of the pipes are threaded.

In the embodiment, all the component parts constructing the heat exchanger 7 are made of aluminum and integrally brazed.

Next, operation of the vapor compression refrigerant cycle will be described.

The high-pressure and high-temperature refrigerant having been compressed in the compressor 1 is cooled in the radiator 2. In the embodiment, carbon dioxide is used as the refrigerant. In a case of having large heat load, for example in hot weather, a discharge pressure of the compressor 1, that is, a pressure of the high refrigerant, exceeds a critical pressure of the refrigerant. Therefore, in the radiator 2, the refrigerant reduces the enthalpy while reducing the temperature without condensing.

Then, the high pressure refrigerant discharged from the radiator 2 is cooled in the internal heat exchanger 5 by the low pressure refrigerant. In the condition that the enthalpy is further reduced, the refrigerant is decompressed in the expansion valve 3 and becomes into the gas and liquid phase state.

In the evaporator 4, the gas refrigerant in the gas and liquid refrigerant that has been decompressed by the expansion valve 3 evaporates by absorbing heat from the air to be blown into the passenger compartment and flows into the accumulator 6.

Then, the gas refrigerant in the accumulator 6 is sucked by the compressor 1. After compressed in the compressor 1, the refrigerant is discharged from the compressor 1 to the radiator 2.

Next, advantages of the heat exchanger 7 will be described.

When the heat exchanger 7 is mounted at the front of the vehicle such that the tubes 2a are horizontal, the cooling air generally passes through the top portion and the bottom portion more than the left and right ends. In this case, the internal heat exchanger 5 is located at the end of the radiator 2. Thus, the top portion and the bottom portion can be provided for heat exchanging portions of the radiator 2, so the radiator 2 maintains its cooling capacity.

On the other hand, the internal heat exchanger 5 performs heat exchange between the high-pressure refrigerant and the low-pressure refrigerant. That is, the heat is not exchanged between air and refrigerant. Therefore, the heat exchanging capacity of the internal heat exchanger 5 is not degraded even if it is located at a part receiving less cooling air.

Therefore, by integrating the internal heat exchanger 5 with the radiator 2, the heat exchanger 7 is easily mounted on the vehicle without reducing the cooling capacity of the radiator 2.

In FIG. 2, the internal heat exchanger 5 is attached to the right end of the radiator 2. However, the internal heat exchanger 5 can be attached at the other end of the radiator 2.

Further, the header tank 2c is arranged at the end of the radiator 2. The longitudinal axis of the header tank 2c is parallel to the longitudinal axes of the high pressure tube 5b and the low pressure tube 5d of the internal heat exchanger 5. The joining surface area between the internal heat exchanger 5 and the header tank 2c is large. Therefore, the internal heat exchanger 5 is easily connected to the header tank 2c.

On the contrary, if the longitudinal axis of the header tank 2c is not parallel with the longitudinal axis of the internal heat exchanger 5, the joining surface area is small and it is difficult to directly braze the internal heat exchanger 5 to the header tank 2c. In such case, fixing member such as a bracket is required to connect the internal heat exchanger 5 with the header tank 2c.

The high pressure refrigerant passages 5a are arranged closer to the radiator 2 than the low pressure refrigerant passages 5c. Therefore, it is easy to adjoin the refrigerant outlet 2d of the radiator 2 and the refrigerant inlet 5e of the internal heat exchanger 5.

Therefore, the radiator 2 and the internal heat exchanger 5 are integrated together without difficulty. Further, the refrigerant can be directly introduced from the radiator 2 to the internal heat exchanger 5. A refrigerant pipe communicating the radiator 2 and the internal heat exchanger 5 is not required. Accordingly, pressure loss due to friction with the pipe reduces. Also, the number of the component parts reduces.

The high pressure refrigerant passages 5a are arranged adjacent to the radiator 2. Therefore, the high pressure refrigerant passages 5a functions as heat insulating portion restricting heat of the high pressure refrigerant flowing through the radiator 2 from transferring to the low pressure refrigerant flowing through the internal heat exchanger 5.

Accordingly, heat to be radiated to outside air by the radiator 2 is restricted from transferring to the low pressure refrigerant in the internal heat exchanger 5. A temperature gap between the refrigerant in the radiator 2 and the air can be maintained. Therefore, the radiator 2 provides the heat radiating capacity and the internal heat exchanger 5 provides the function reducing the enthalpy of the refrigerant discharging from the radiator 2.

Second Embodiment

Figures 3A, 3B:
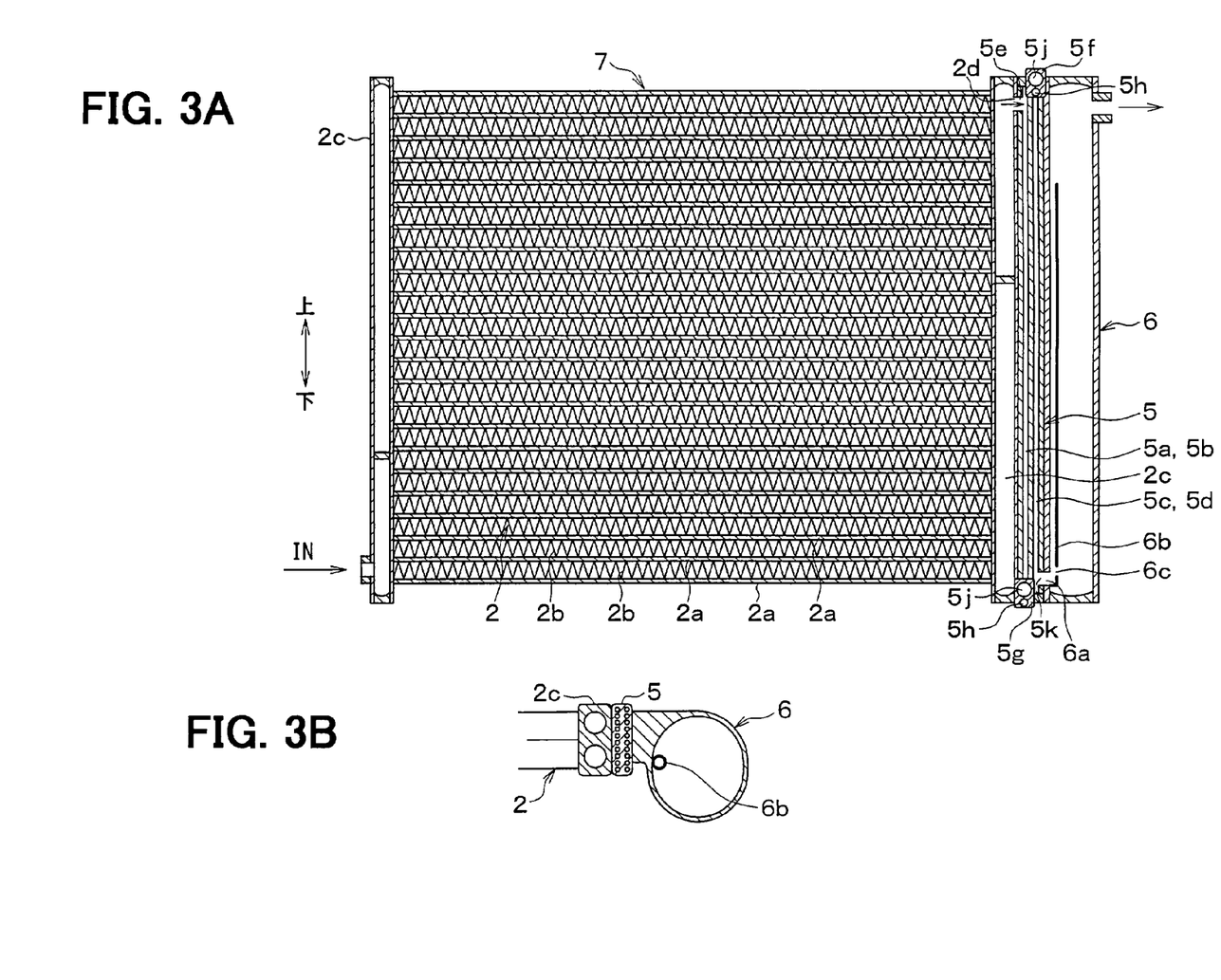
FIG. 3A is a cross-sectional view of a heat exchanger according to the second embodiment of the present invention.
FIG. 3B is a cross-sectional view of a main part of the heat exchanger including an accumulator according to the second embodiment of the present invention.

In the second embodiment, the accumulator 6 is integrated into the heat exchanger 7 of the first embodiment.

As shown in FIGS. 3A and 3B, the radiator 2, the internal heat exchanger 5 and the accumulator 6 are integrally brazed in a condition that the internal heat exchanger 5 is arranged between the radiator 2 and the accumulator 6. Specifically, the longitudinal axis of the accumulator 6 is substantially parallel to the longitudinal axis of the header tank 2c. Further, a gas refrigerant outlet 6a of the accumulator 6 and a refrigerant inlet 5k of the internal heat exchanger 5 are adjoined to each other.

In the accumulator 6, a gas refrigerant discharging pipe 6b is provided such that its top end is open in a top space (gas refrigerant space) of the accumulator 6, so that the gas refrigerant is introduced to the refrigerant inlet 5k of the internal heat exchanger 5. An oil return hole 6c is formed at a bottom portion of the pipe 6b to suck a refrigerator oil that is separated and extracted from the refrigerant by density gap.

Therefore, the second embodiment provides advantages similar to those of the first embodiment. In addition, since the internal heat exchanger 5 is located between the radiator 2 and the accumulator 6, it is less likely that the low temperature refrigerant in the accumulator 6 will be heated by the high temperature refrigerant flowing in the radiator 2.

If the low temperature refrigerant in the accumulator 6 is heated, density of the refrigerant to be sucked into the compressor 1 is lowered. With this, a refrigerant flow rate and a heat radiating rate of the radiator 2 drop, resulting in a decrease in a refrigerating capacity of the vapor compression refrigerant cycle.

Third Embodiment

Figure 4:
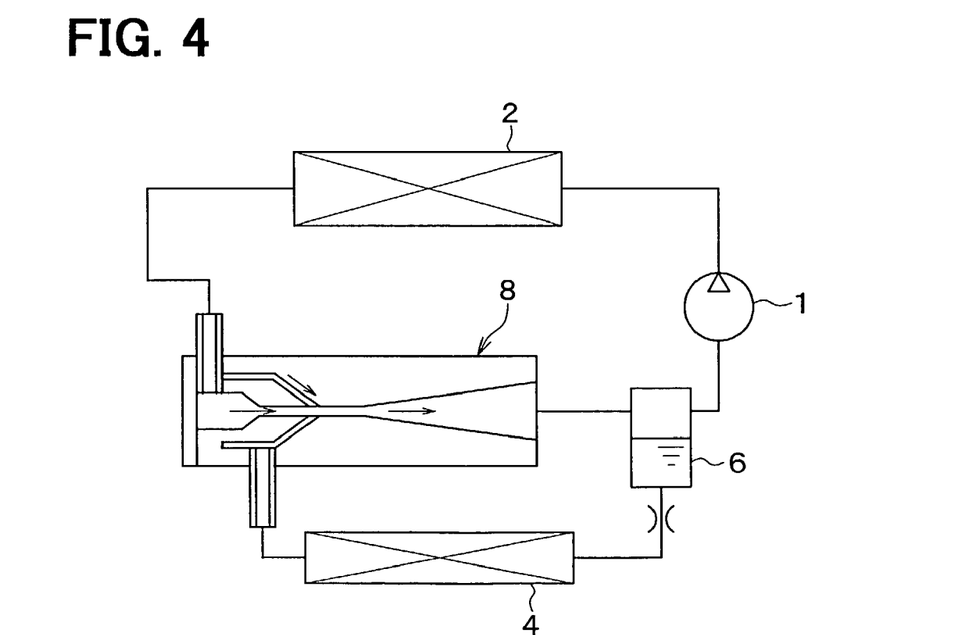
FIG. 4 is a schematic diagram of a vapor compression refrigerant cycle according to the third embodiment of the present invention.
Figure 5:
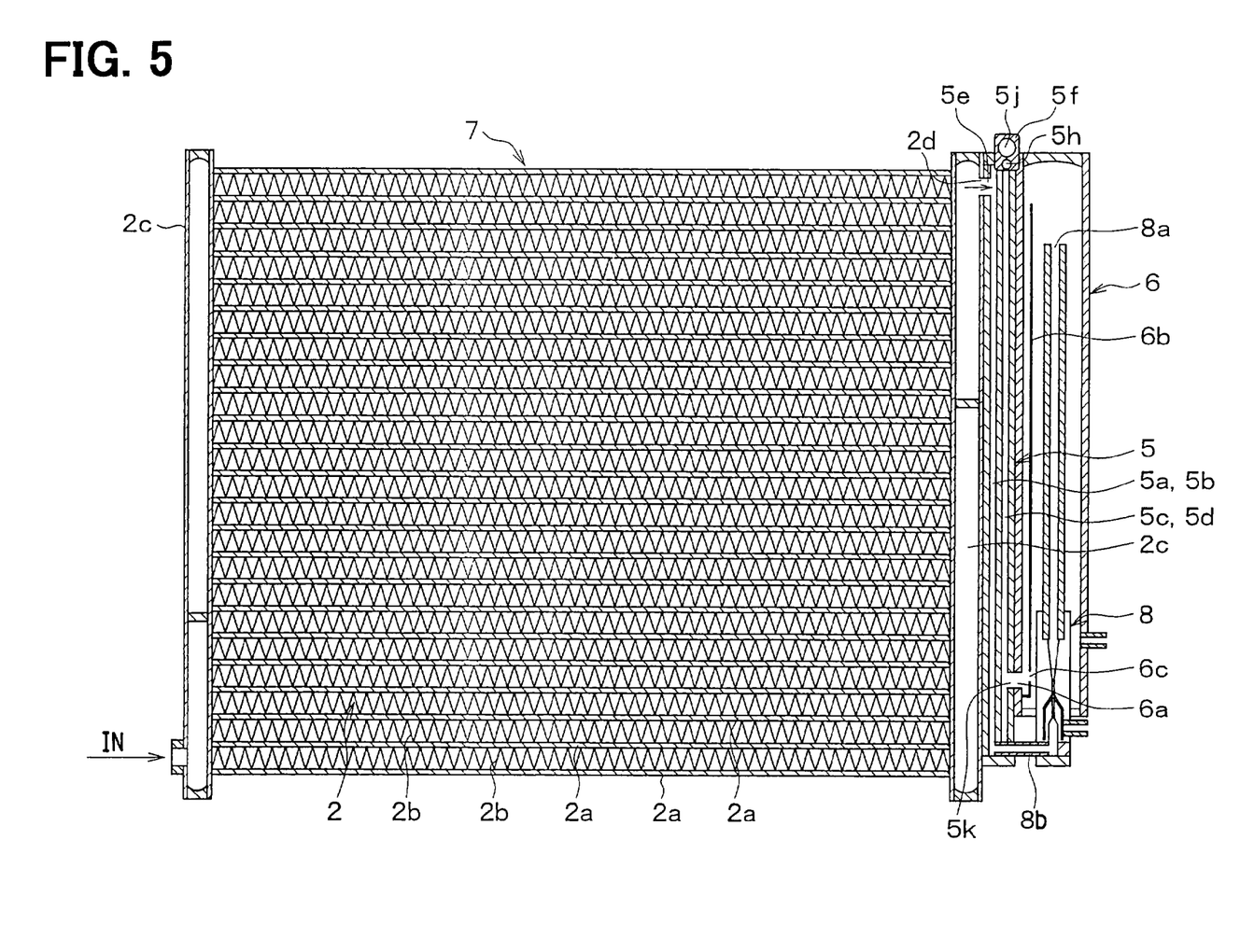
FIG. 5 is a cross-sectional view of a heat exchanger including an ejector according to the third embodiment of the present invention.

In the third embodiment, as shown in FIG. 4, an ejector 8 is used as a decompressing means of the vapor compression refrigerant cycle, in place of the expansion valve 3. The ejector 8 decompresses the refrigerant in the isenthalpic and converts the enthalpy decreased by the decompression to pressure energy. Further, as shown in FIG. 5, a refrigerant passage 8b through which the refrigerant is introduced from the internal heat exchanger 5 to the ejector 8, the radiator 2, the internal heat exchanger 5, the accumulator 6 and the ejector 8 are integrated.

The ejector 8 is accommodated in the accumulator such that a refrigerant outlet 8a is located at the top space of the accumulator 6 and the longitudinal axis of the ejector 8 is substantially parallel to the longitudinal axis of the accumulator 6.

The ejector 8 functions as a decompressing means and a pumping means (see for example, JIS Z 8126 No. 2. 1. 2. 3). The ejector 8 includes a nozzle for decompressing and expanding the refrigerant, a mixing portion for increasing a suction pressure of the compressor 1 by sucking the gas refrigerant evaporated in the evaporator 4 and converting expansion energy to pressure energy, and a pressure increasing portion including a diffuser.

In the embodiment, to increase a velocity of the refrigerant jetting from the nozzle more than a velocity of sound, a Laval nozzle having a throat portion throttling the passage therein is used. (See "Fluid engineering", Tokyo University Press) The gas refrigerant in the accumulator 6 is sucked into the compressor 1. The refrigerant discharged from the compressor 1 is cooled in the radiator 2 and then introduced to the ejector 8. The refrigerant is decompressed and expanded at the nozzle and jetted from the nozzle at high speed while sucking the refrigerant from the evaporator 4.

At this time, the refrigerant jetted from the nozzle and the refrigerant sucked from the evaporator 4 are mixed at the mixing portion to maintain the sum of momentum of those refrigerants. Therefore, the pressure (static pressure) of the refrigerant increases at the mixing portion.

In the diffuser, a cross-sectional area of the passage, that is, an inside diameter of the diffuser, gradually increases. Therefore, speed energy of the refrigerant (dynamic pressure) is converted to pressure energy (static pressure). Accordingly, in the ejector 8, the refrigerant pressure increases at the mixing portion and the diffuser.

That is, in an ideal ejector, the refrigerant pressure increases such that the sum of the momentum of the refrigerants is maintained at the mixing portion and the energy is maintained at the diffuser.

When the refrigerant in the evaporator 4 is sucked into the ejector 8, the liquid refrigerant is introduced from the accumulator 6 into the evaporator 4. The liquid refrigerant evaporates by absorbing heat from the air to be blown into the passenger compartment.

Then, the refrigerant sucked from the evaporator 4 and the refrigerant jetting from the nozzle are mixed at the mixing portion. The refrigerant returns to the accumulator 6 by converting the dynamic pressure to the static pressure.

In the embodiment, the radiator 2, the internal heat exchanger 5, the accumulator 6 and the ejector 8 are integrated. Therefore, connection therebetween is simple and the mountability or arrangement onto the vehicle improves.

In the ejector 8, the mixing portion and the diffuser are relatively long. Since the ejector 8 is arranged such that its longitudinal axis is substantially parallel to the longitudinal axis of the accumulator 6. Therefore, the ejector 8 can be easily mounted on the vehicle as long as the ejector 8 is equal to or shorter than the header tank 2c. Thus, the mountability of the ejector 8 improves.

Fourth Embodiment

In the above embodiments, the high pressure tube 5b and the low pressure tube 5d are provided by the single extruded tube. In the fourth embodiment, the high pressure tube 5b and the low pressure tube 5d are separately formed by the extrusion or drawing and integrated one another by brazing or soldering, as shown in FIG. 6.

Figure 6:
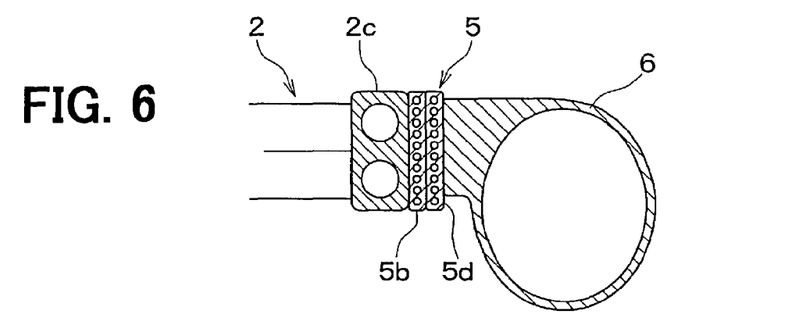
FIG. 6 is a cross-sectional view of a main part of a heat exchanger including an accumulator according to the fourth embodiment of the present invention.

In FIG. 6, the accumulator 6 is integrated into the heat exchanger 7. However, it is not always necessary to integrate the accumulator 6 into the heat exchanger 7.

Fifth Embodiment

Figure 7:
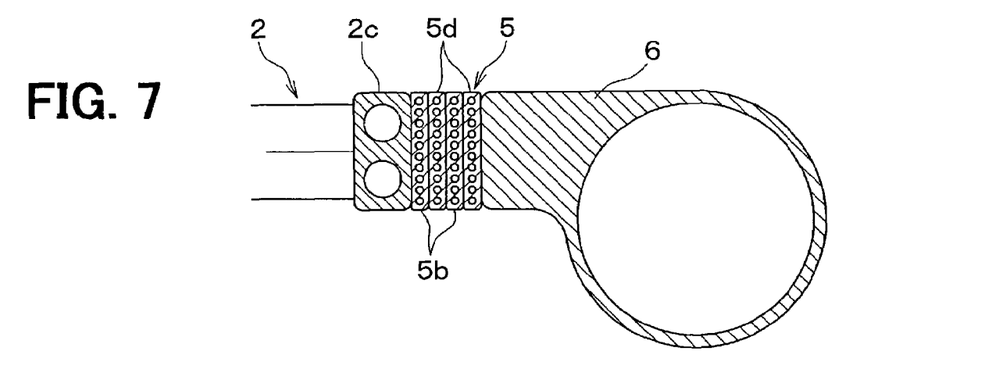
FIG. 7 is a cross-sectional view of a main part of a heat exchanger according to the fifth embodiment of the present invention.

In the fifth embodiment, the internal heat exchanger 5 includes several high pressure tubes 5b and several low pressure tubes 5d, as shown in FIG. 7. The numbers of the tubes 5b, 5d are not limited.

For example, the internal heat exchanger can include singe high pressure tube 5b and several low pressure tubes 5d. Alternatively, the internal heat exchanger 5 can include several high pressure tubes 5b and single low pressure tube 5d.

The tubes 5b, 5d are made in a manner similar to that of the first embodiment and the fourth embodiment, or by other ways.

Sixth Embodiment

Figure 8:
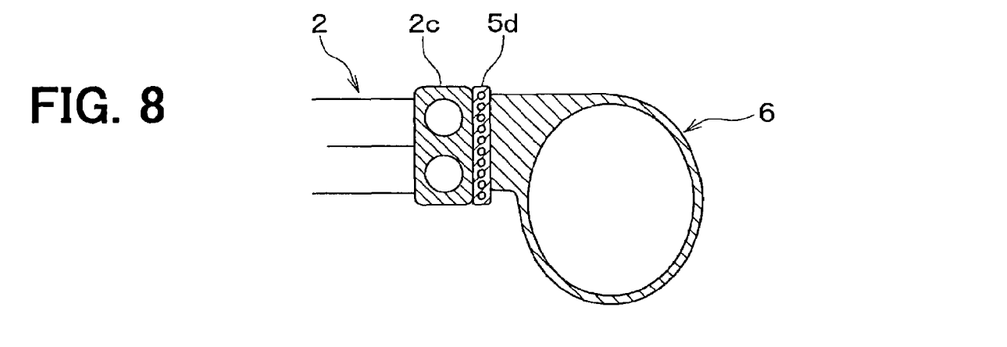
FIG. 8 is a cross-sectional view of a main part of a heat exchanger according to the sixth embodiment of the present invention.

In the sixth embodiment, the internal heat exchanger 5 is constructed to perform heat exchange between the high pressure refrigerant flowing in the header tank 2c and the low pressure refrigerant flowing in the low pressure tube 5d.

Because the structure of the heat exchanger 7 including the internal heat exchanger 5 is simple, the mountability of the heat exchanger 7 onto the vehicle improves and a manufacturing cost reduces.

Seventh Embodiment

Figure 9:
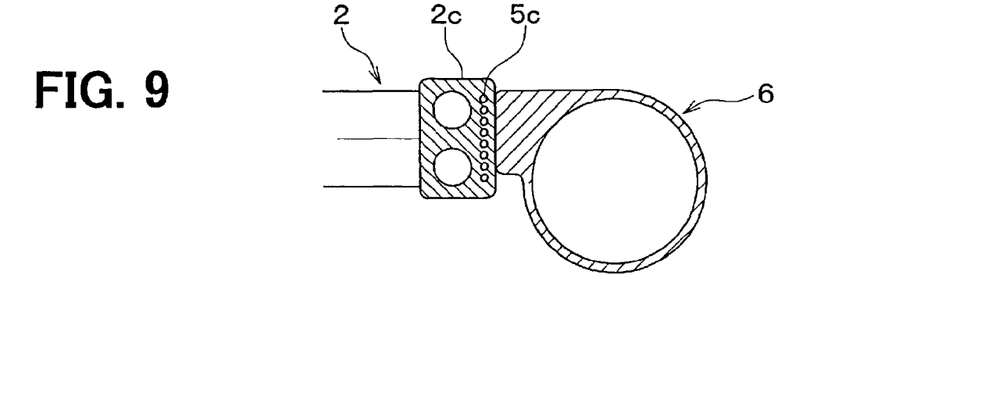
FIG. 9 is a cross-sectional view of a main part of a heat exchanger according to the seventh embodiment of the present invention.

The seventh embodiment is a modification of the sixth embodiment. As shown in FIG. 9, the low pressure refrigerant passages 5c are formed in the header tank 2c and the low pressure tube 5d is not provided. The header tank 2c is formed by extrusion or drawing.

Eighth Embodiment

Figure 10:
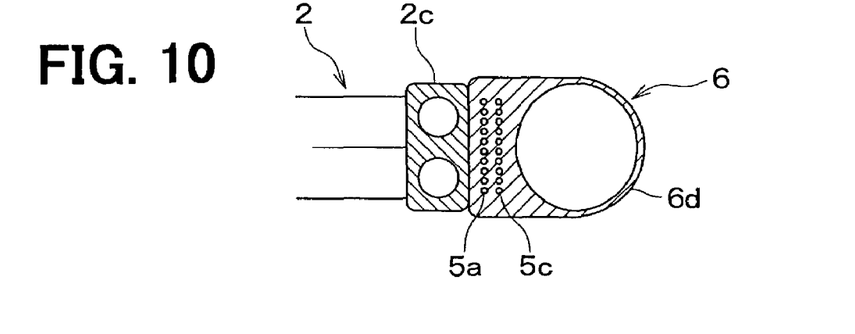
FIG. 10 is a cross-sectional view of a main part of a heat exchanger according to the eighth embodiment of the present invention.

As shown in FIG. 10, the high pressure refrigerant passages 5a and the low pressure refrigerant passages 5c are formed in a tank body 6d of the accumulator 6. The high pressure tube 5b and the low pressure tube 5d are not provided. Here, the tank body 6d has a generally cylindrical shape and forms a tank space therein. The refrigerant is separated into the gas refrigerant and the liquid refrigerant and the liquid refrigerant is stored in the tank space.

Because the structure of the heat exchanger 7 including the accumulator 6 is simple, the mountability of the heat exchanger 7 onto the vehicle improves and the manufacturing costs of the heat exchanger 7 reduces.

Ninth Embodiment

Figure 11:
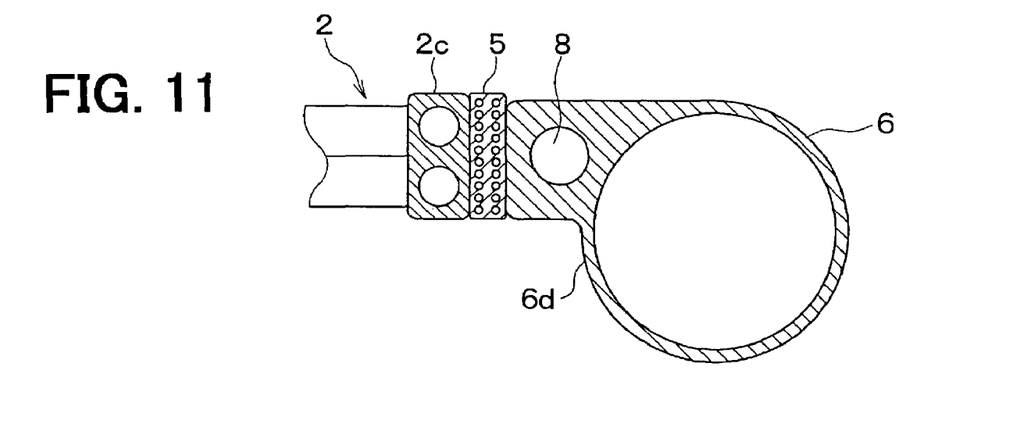
FIG. 11 is a cross-sectional view a main part of a heat exchanger according to the ninth embodiment of the present invention.

As shown in FIG. 11, the tank body 6d of the accumulator 6 forms a housing of the ejector 8. The ejector 8 is located between the internal heat exchanger 5 and the accumulator 6. Also, the ejector 8 is formed such that the longitudinal axis of the ejector 8 is substantially parallel to the longitudinal axis of the accumulator 6.

Because the structure of the heat exchanger 7 including the ejector 8 is simple, the mountability of the heat exchanger 7 onto the vehicle improves and the manufacturing cost of the heat exchanger 7 reduces.

Tenth Embodiment

Figure 12:
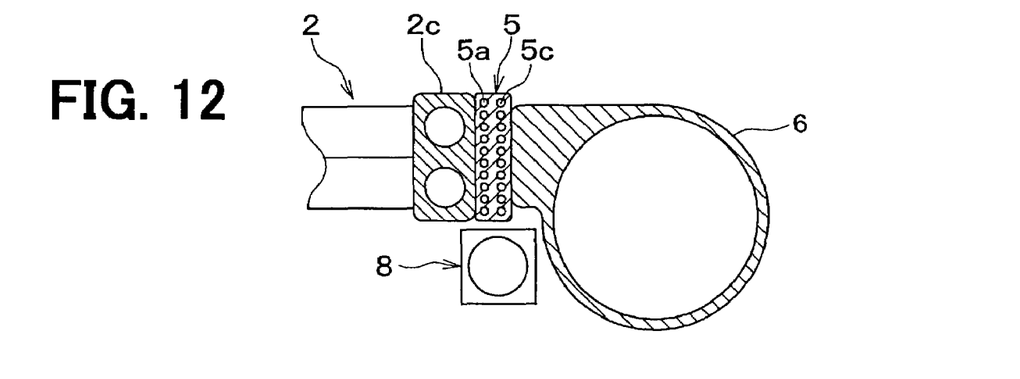
FIG. 12 is a cross-sectional view of a main part of a heat exchanger according to the tenth embodiment of the present invention.

As shown in FIG. 12, the ejector 8 is provided outside of the accumulator 6 and arranged such that its longitudinal axis is substantially parallel to the longitudinal axis of the accumulator 6.

Eleventh Embodiment

Figure 13:
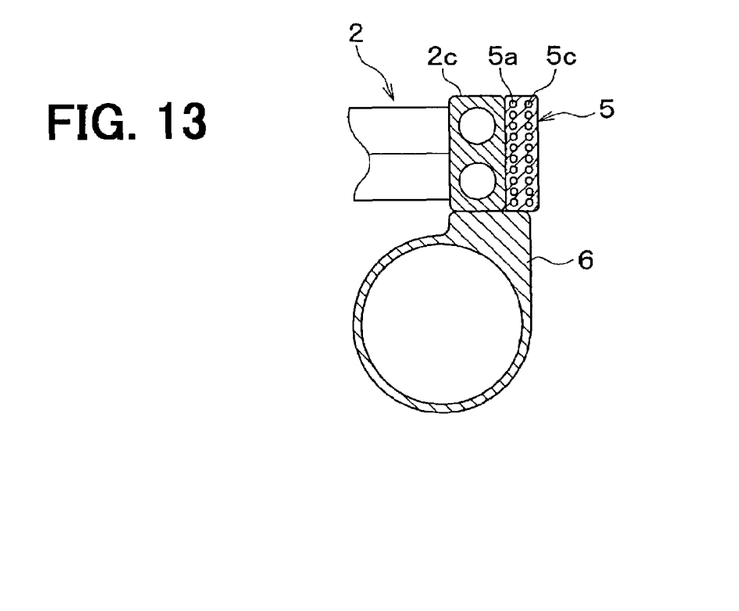
FIG. 13 is a cross-sectional view of a main part of a heat exchanger according to the eleventh embodiment of the present invention.

As shown in FIG. 13, the accumulator 6 is arranged substantially parallel to the header tank 2c and in row in a direction substantially perpendicular to the longitudinal directions of the tubes 2a.

Twelfth Embodiment

Figure 14:
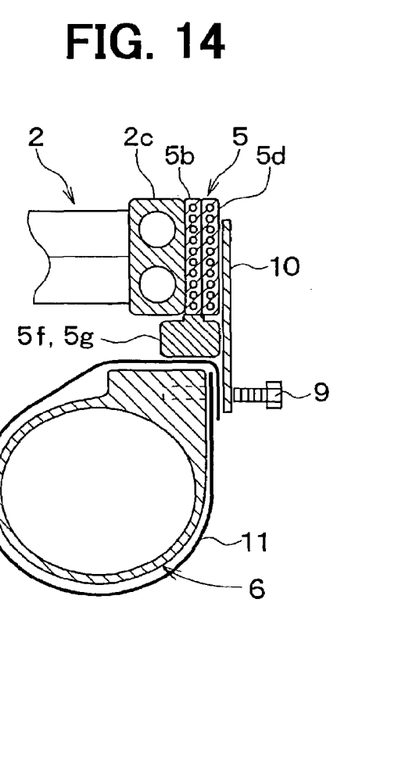
FIG. 14 is a cross-sectional view of a main part of a heat exchanger according to the twelfth embodiment of the present invention.

The accumulator 6 is fastened with the heat exchanger 7 by a mechanical fastening means such as screws, in place of brazing and soldering. As shown in FIG. 14, a bracket 10 having a plate shape is brazed or soldered to the internal heat exchanger 5 (low pressure tube 5d). A band 11 surrounding the outer periphery of the accumulator 6 is fastened with the bracket 10 by a bolt 9 so that the accumulator 6 is held.

Thirteenth Embodiment

Figure 15:
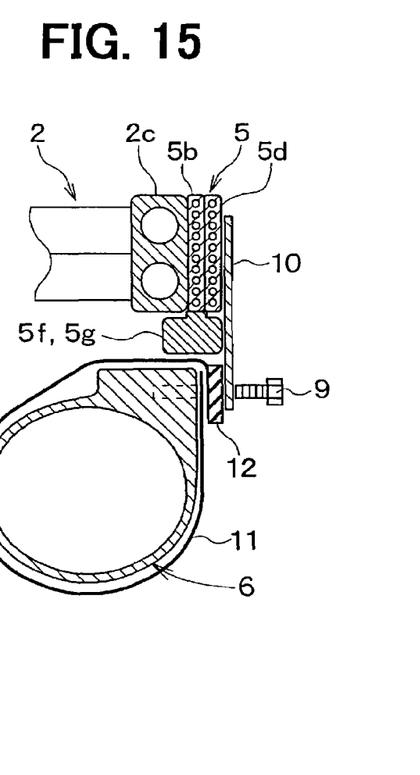
FIG. 15 is a cross-sectional view of a main part of a heat exchanger according to the thirteenth embodiment of the present invention.

As shown in FIG. 15, a heat-insulating portion 12 is provided between the radiator 2 and the accumulator 6 to restricting a heat transfer therebetween.

The heat-insulating portion 12 is for example made of a heat-insulating rubber and sandwiched between the bracket 10 and the accumulator 6. The heat-insulating portion 12 restricts the heat transfer from the internal heat exchanger 5 to the accumulator 6 in a heat path from the radiator 2, the internal heat exchanger 5 to the accumulator 6. Accordingly, it is less likely that the low temperature refrigerant accumulated in the accumulator 6 will be heated.

Fourteenth Embodiment

Figure 16:
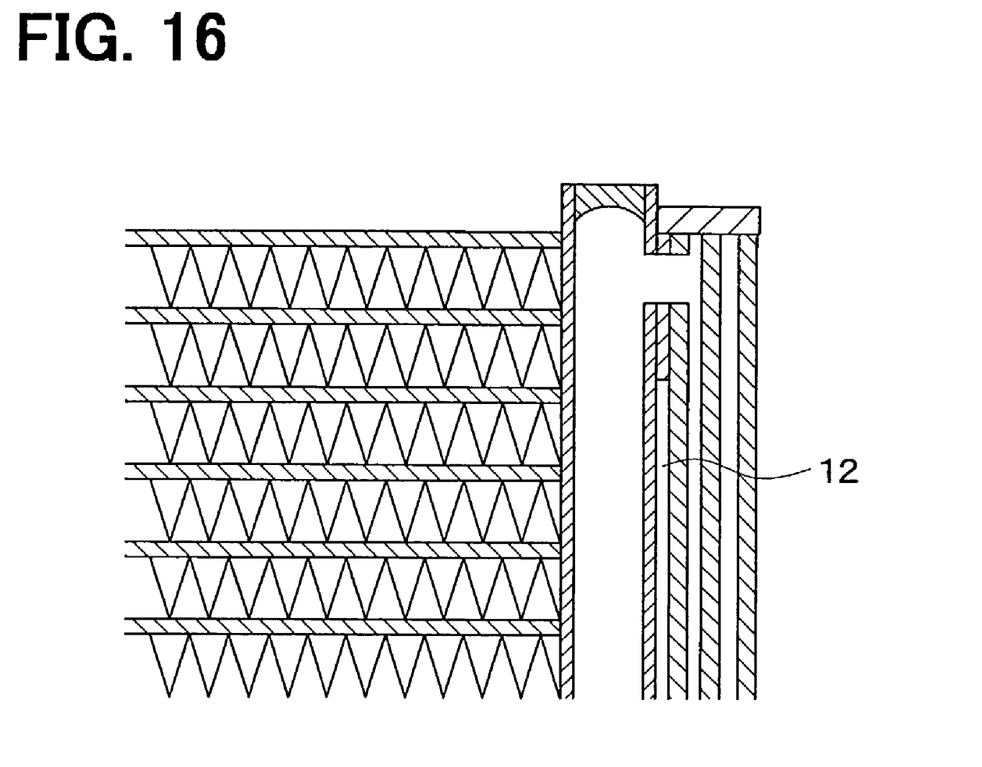
FIG. 16 is a cross-sectional view of a main part of a heat exchanger according to the fourteenth embodiment of the present invention.

As shown in FIG. 16, a gap is defined between the header tank 2c and the internal heat exchanger 5 as the heat-insulating portion 12 to restrict the heat from transferring from the radiator 2 to the internal heat exchanger 5 and the accumulator 6.

Because the heat transfer to the internal heat exchanger 5 and the accumulator 6 is restricted, the radiator 2 provides the heat radiating capacity and the internal heat exchanger 5 provides the heat exchanging performance In FIG. 16, although the accumulator 6 is not illustrated, the accumulator 6 can be integrated in a manner similar to that of the third embodiment. In this case, the low temperature refrigerant in the accumulator 6 is less likely to be heated by the heat of the radiator 2.

Fifteenth Embodiment

Figure 17:
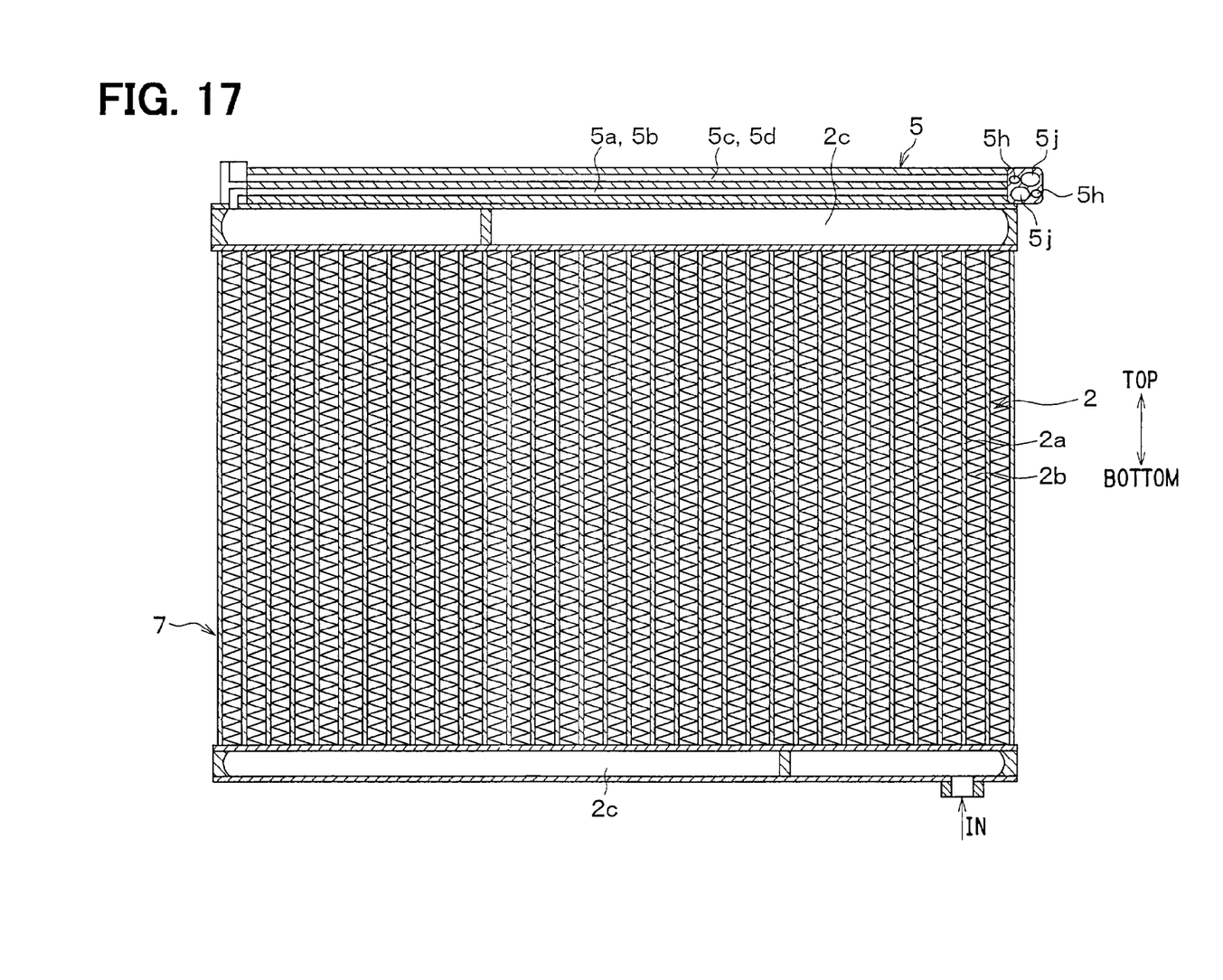
FIG. 17 is a cross-sectional view of a heat exchanger according to the fifteenth embodiment of the present invention.
Figure 18:
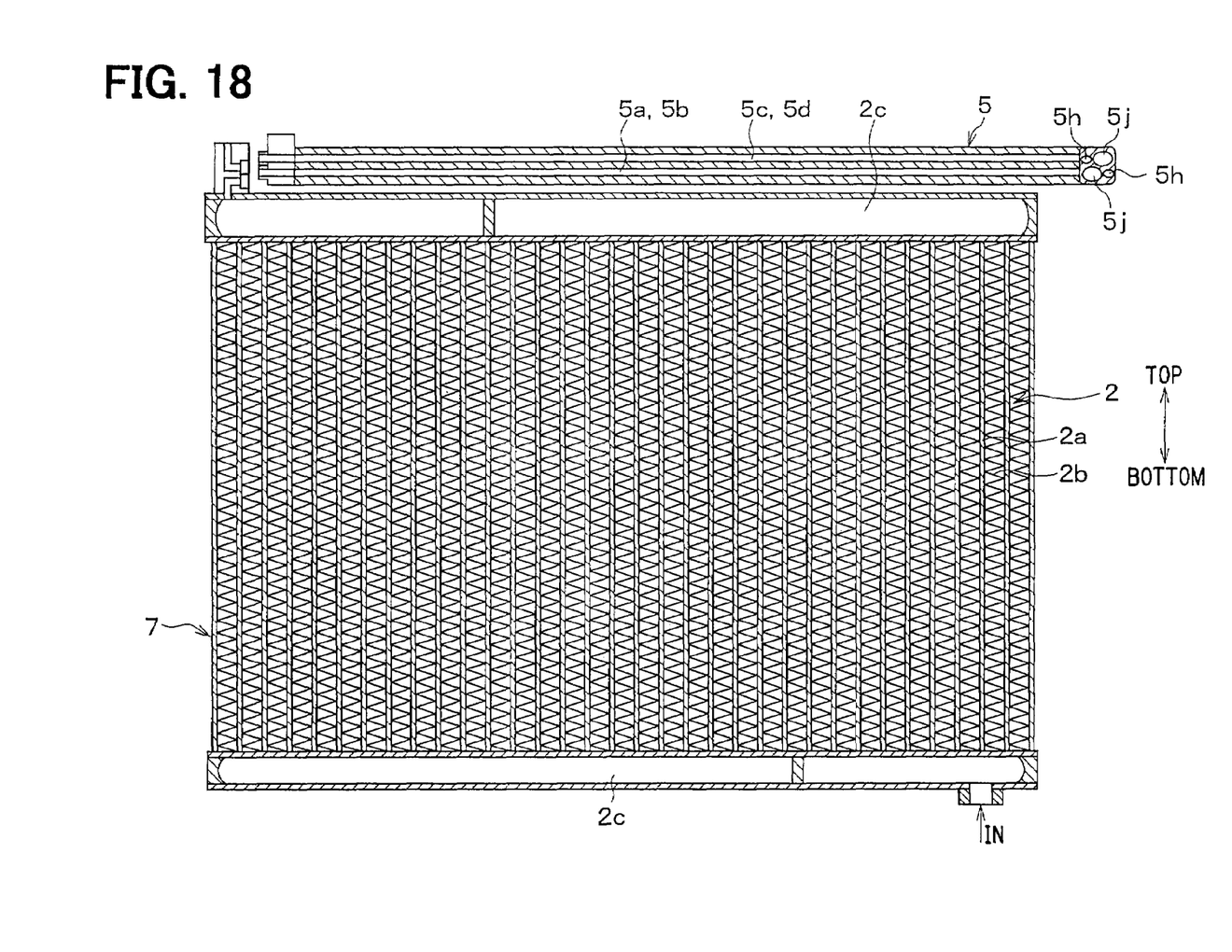
FIG. 18 is a cross-sectional view of a heat exchanger according to the fifteenth embodiment of the present invention.

As sown in FIGS. 17 and 18, the internal heat exchanger 5 is attached to the top side of the radiator 2. The tubes 2a are arranged vertically and the header tanks 2c are arranged horizontally. The internal heat exchanger 5 is arranged such that its longitudinal axis is substantially parallel to the longitudinal axis of the header tank 2c.

In a case that the cooling air generally flows to the ends of the heat exchanger 7 and less flows to the top and the bottom sides of the heat exchanger 7 when in use, the arrangements shown in FIGS. 17 and 18 are effective because the ends of the heat exchanger 7 can be used for the heat exchanging portion of the radiator 2.

Since the internal heat exchanger 5 does not exchange heat between air and refrigerant, the internal heat exchanger 5 is not degraded even if it is provided at the portion receiving less cooling air. Therefore, the performance of the internal heat exchanger 5 is not lessened.

Accordingly, the mountability of the heat exchanger 7 is improved by integrating the internal heat exchanger 5 with the radiator 2, without lessening the cooling capacity of the radiator 2.

In FIG. 17, the internal heat exchanger 5 is brazed with the radiator 2. In FIG. 18, the internal heat exchanger 5 is joined to the radiator 2 by the fastening means such as the screws. In this case, the internal heat exchanger 5 is detachable. Further, the internal heat exchanger 5 can be attached to the bottom side of the radiator 2.

Other Embodiments

In the above embodiments, the vapor compression refrigerant cycle of the present invention is applied to the vehicular air conditioning apparatus. However, the vapor compression cycle is not limited to the above. For example, it can be used for refrigerated vehicles and insulated vehicles.

The high pressure tube 5b and the low pressure tube 5d can be eliminated from the internal heat exchanger 5, so that heat is exchanged between the refrigerant in the radiator 2 (header tank 2c) and the refrigerant in the accumulator 6.

Further, the internal heat exchanger 5 and the radiator 2 can be joined by a method other than brazing and soldering. For example, the internal heat exchanger 5 can be joined with the radiator 2 by a mechanical fastening means such as screws and brackets. In this case, because the joining surface area for joining the internal heat exchanger 5 and the header tank 2c can be increased by the bracket, the internal heat exchanger 5 and the radiator 2 are easily connected.

The refrigerant is not limited to the carbon dioxide. One of natural refrigerant such as nitrogen, HFC (hydrofluoric carbon) refrigerant, and HFE (hydrofluoric ether) refrigerant, and mixture of some of them can be used as the refrigerant in the cycle.

The present invention should not be limited to the disclosed embodiments, but may be implemented in other ways without departing from the spirit of the invention.

What is claimed is:

1. A heat exchanging apparatus for a vapor compression refrigerant cycle comprising:
   a first heat exchanger radiating heat of a first refrigerant into air, the first heat exchanger including a plurality of tubes arranged in parallel and a header tank arranged at longitudinal ends of the tubes such that a longitudinal axis of the header tank is perpendicular to longitudinal axes of the tubes; and
   a second heat exchanger performing heat exchange between the first refrigerant and a second refrigerant having pressure lower than that of the first refrigerant, wherein
   the second heat exchanger is integrated with the header tank of the first heat exchanger such that a longitudinal axis of the second heat exchanger is parallel to the longitudinal axis of the header tank;
   the second heat exchanger is forming a first passage, the first refrigerant is flowing through the first passage and a second passage, the second refrigerant is flowing through the second passage;
   the first passage and the second passage are arranged in parallel with each other; and
   the first passage is located between the header tank and the second passage;
   the heat exchanger further comprising:
   a gas-liquid separator separating refrigerant into a gas refrigerant and a liquid refrigerant and storing a surplus liquid refrigerant therein,
   the gas-liquid separator is integrated with the first heat exchanger such that the second heat exchanger is located between the first heat exchanger and the gas-liquid separator; and
   an ejector increasing pressure of the refrigerant,
   the ejector is integrated with the second heat exchanger and the gas-liquid separator.

2. The heat exchanging apparatus according to claim 1, wherein the second heat exchanger communicates with the ejector through a refrigerant passage integrally formed therebetween.

3. The heat exchanging apparatus according to claim 1, wherein the ejector is accommodated in the gas-liquid separator such that a refrigerant outlet of the ejector is open in a gas refrigerant space of the gas-liquid separator.

4. The heat exchanging apparatus according to claim 1, wherein the ejector is disposed such that a longitudinal axis of the ejector is parallel to the longitudinal axis of the gas-liquid separator.

5. The heat exchanging apparatus according to claim 1, wherein the gas-liquid separator includes a tank body formed by one of extrusion and drawing, wherein the ejector is partly provided by the tank body.

6. The heat exchanging apparatus according to claim 5, wherein the ejector is disposed between the second heat exchanger and the gas-liquid separator in a refrigerant path.

7. A vapor compression refrigerant cycle comprising:
a compressor for compressing a refrigerant;
a first heat exchanger radiating heat of a high pressure refrigerant compressed by the compressor into air;
a second heat exchanger performing heat exchange between the high pressure refrigerant and a low pressure refrigerant having a pressure lower than that of the high pressure refrigerant;
a third heat exchanger evaporating the low pressure refrigerant by absorbing heat from air;
a gas-liquid separator separating refrigerant into gas refrigerant and liquid refrigerant, storing a surplus liquid refrigerant therein and supplying the gas refrigerant to the compressor and the liquid refrigerant to the third heat exchanger; and
an ejector decompressing the high pressure refrigerant and circulating the refrigerant to the third heat exchanger,
the first heat exchanger, the second heat exchanger, the gas-liquid separator, and the ejector are integrated, and the second heat exchanger is connected to an end of the first heat exchanger.

8. The vapor compression refrigerant cycle according to claim 7, wherein the second heat exchanger communicates with an inlet of the ejector through a refrigerant passage integrally formed therebetween.

9. The vapor compression refrigerant cycle according to claim 7, wherein the ejector is accommodated in the gas-liquid separator such that an outlet of the ejector is open in a gas refrigerant space in the gas-liquid separator.

10. The vapor compression refrigerant cycle according to claim 7, wherein the ejector is disposed such that its longitudinal axis is substantially parallel to a longitudinal axis of the gas-liquid separator.

11. The vapor compression refrigerant cycle according to claim 7, wherein the gas-liquid separator includes a tank body formed by one of extrusion and drawing, and the ejector is partly provided by the tank body.

12. The vapor compression refrigerant cycle according to claim 11, wherein the ejector is arranged between the second heat exchanger and the gas-liquid separator in a refrigerant path.

13. The vapor compression refrigerant cycle according to claim 11, wherein the tank body of the gas-liquid separator is connected to one of the first heat exchanger and the second heat exchanger with a fastening device by interposing a heat insulating portion therebetween.

14. The vapor compression refrigerant cycle according to claim 7, wherein the second heat exchanger, the first heat exchanger, and the gas-liquid separator are integrated by one of brazing and soldering.

15. The vapor compression refrigerant cycle according to claim 7, the second heat exchanger includes a tube formed by one of extrusion and drawing, the tube defines passages, the high pressure refrigerant and low pressure refrigerant are flowing parallel through the passages,
the tube is arranged such that longitudinal axes of the passages are parallel to longitudinal axes of the ejector and the gas-liquid separator.

16. The vapor compression refrigerant cycle according to claim 7, wherein the refrigerant is at least one of carbon dioxide, natural refrigerant, HFC refrigerant, and HFE refrigerant.

17. A heat exchanging apparatus for a vapor compression refrigerant cycle comprising:
a first heat exchanger radiating heat of a first refrigerant into air, the first heat exchanger including a plurality of tubes arranged in parallel and a header tank arranged at longitudinal ends of the tubes such that a longitudinal axis of the header tank is perpendicular to longitudinal axes of the tubes;
a second heat exchanger performing heat exchange between the first refrigerant and a second refrigerant having pressure lower than that of the first refrigerant,
a gas-liquid separator separating refrigerant into a gas refrigerant and a liquid refrigerant and storing a surplus liquid refrigerant therein; and
an ejector increasing pressure of the refrigerant;
the second heat exchanger is integrated with first heat exchanger such that a longitudinal axis of the second heat exchanger is parallel to the longitudinal axis of the header tank;
the gas-liquid separator is integrated with the first heat exchanger such that the second heat exchanger is located between the first heat exchanger and the gas-liquid separator; and
the ejector is integrated with the second heat exchanger and the gas-liquid separator.

18. The heat exchanging apparatus according to claim 17, wherein the second heat exchanger communicates with the ejector through a refrigerant passage integrally formed therebetween.

19. The heat exchanging apparatus according to claim 17, wherein the ejector is accommodated in the gas-liquid separator such that a refrigerant outlet of the ejector is open in a gas refrigerant space of the gas-liquid separator.

20. The heat exchanging apparatus according to claim 17, wherein the ejector is disposed such that a longitudinal axis of the ejector is parallel to the longitudinal axis of the gas-liquid separator.

21. The heat exchanging apparatus according to claim 17, wherein the gas-liquid separator includes a tank body formed by one of extrusion and drawing, wherein the ejector is partly provided by the tank body.

22. The heat exchanging apparatus according to claim 21, wherein the ejector is disposed between the second heat exchanger and the gas-liquid separator in a refrigerant path.

* * * * *